Sept. 19, 1939.  H. S. JANDUS ET AL  2,173,276
BUMPER GUARD
Filed Aug. 10, 1938   2 Sheets-Sheet 1
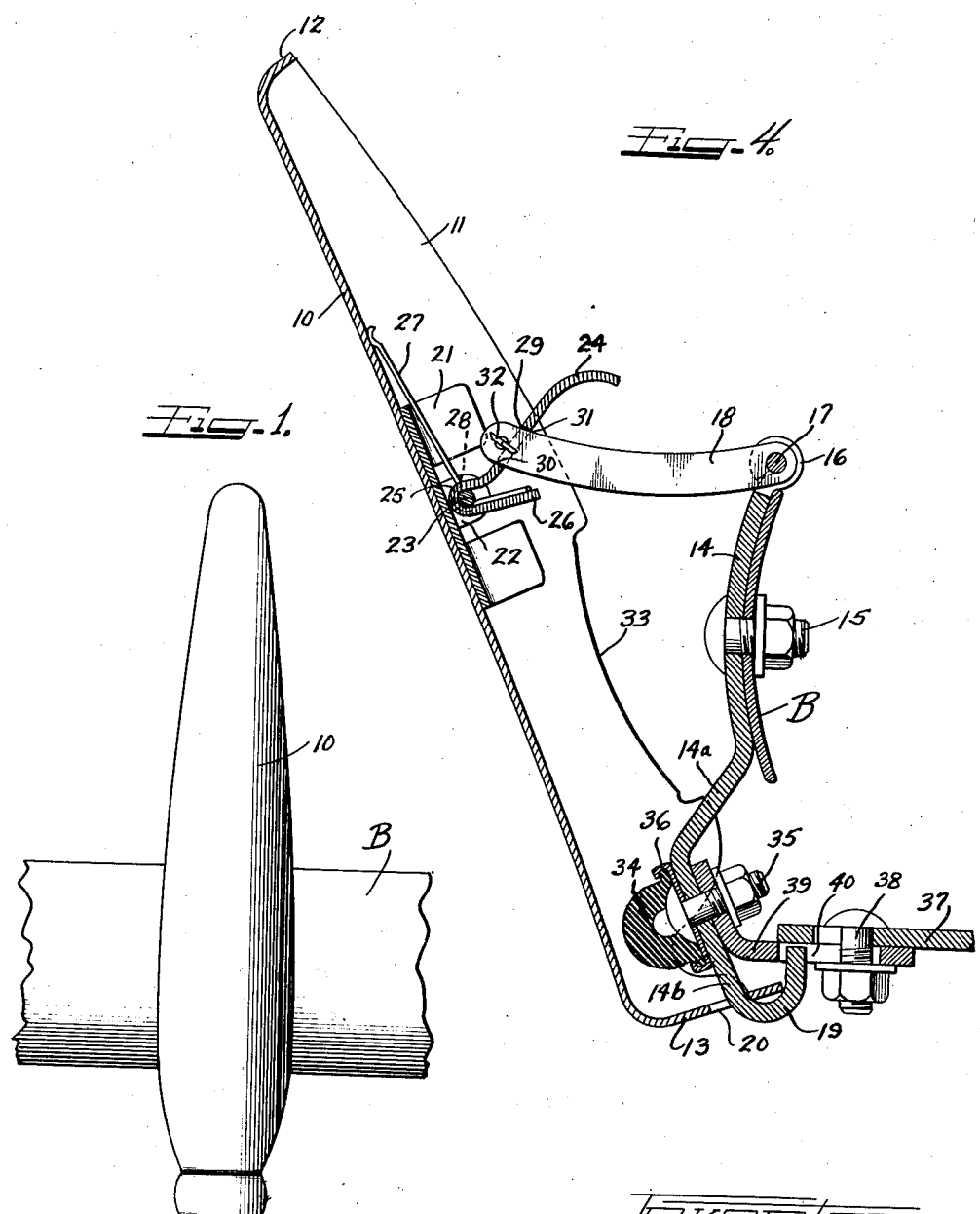
Inventors
Herbert S. Jandus.
Hugh Buchanan.

Sept. 19, 1939.   H. S. JANDUS ET AL   2,173,276
BUMPER GUARD
Filed Aug. 10, 1938    2 Sheets-Sheet 2
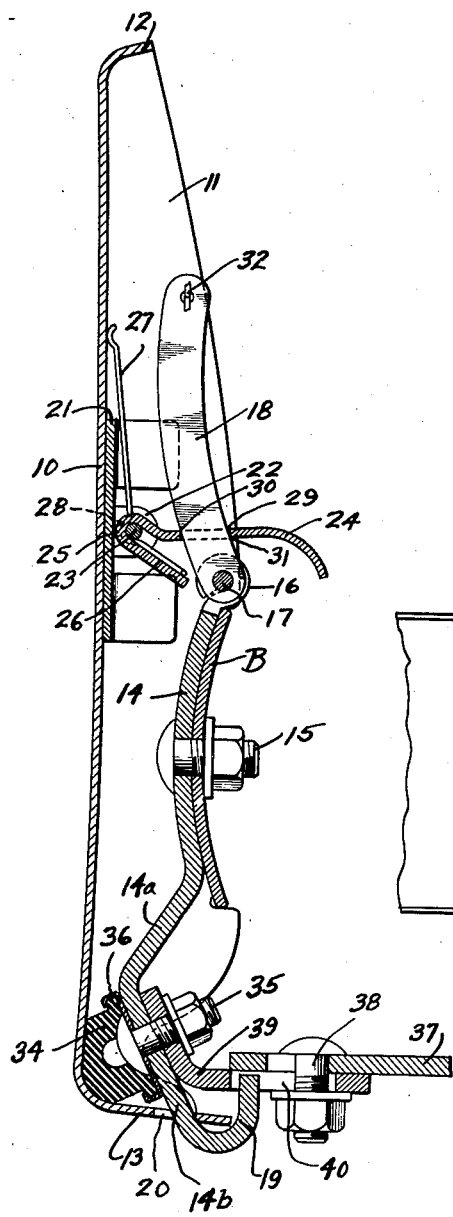
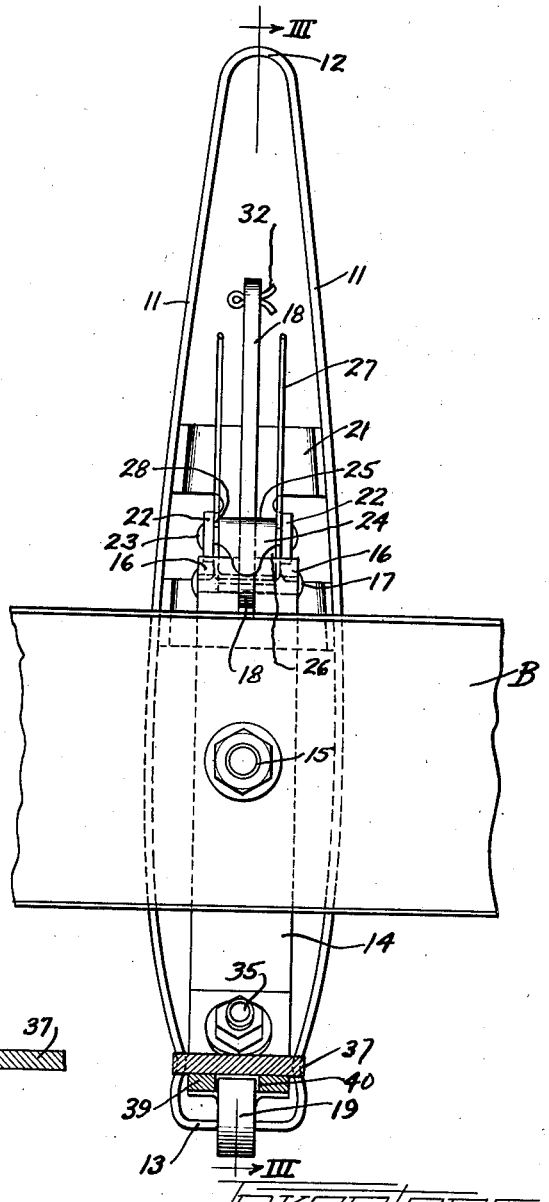
Inventors
HERBERT S. JANDUS.
HUGH BUCHANAN.

Patented Sept. 19, 1939

2,173,276

UNITED STATES PATENT OFFICE 2,173,276

BUMPER GUARD

Herbert S. Jandus and Hugh Buchanan, Detroit, Mich., assignors to Houdaille-Hershey Corporation, Detroit, Mich., a corporation of Michigan Application August 10, 1938, Serial No. 224,024

8 Claims. (Cl. 293—55)

This invention relates to automobile bumper guards and particularly to the type of bumper guards in which the guard body may be swung away from the bumper bar to permit opening of the door of the baggage compartment at the rear of automobiles.

An important object of this invention is to produce such guard structure of a minimum number of parts in the form of simple metal stampings which may be conveniently and quickly assembled.

A further object is to provide improved locking or latching mechanism which will securely hold the guard body in service position and will also hold the guard body in its angular position when swung away from the bumper bar.

A further object is to provide resilient means for taking up all lost motion in the connecting parts when the guard body is in its vertical or service position.

Still another object is to provide structure and arrangement which will permit the guard body to be quickly entirely released at its upper end so that it may be swung to hang down from the lower end of its supporting bracket secured to the bumper bar.

The various features of our invention are shown incorporated in the structure disclosed on the accompanying drawings in which drawings:

Figure 1 is a front elevation of the bumper guard and part of the bumper bar to which it is applied;

Figure 2 is an enlarged rear elevation of the guard and part of the bumper bar;

Figure 3 is a section on plane III—III of Figure 2 showing the guard body in vertical or service position; and Figure 4 is a view similar to Figure 3 showing the guard body swung away at an angle with the bumper bar.

The guard body is of generally channel or U-shaped cross-section and comprises the front impact wall 10, and the side walls 11 and top and bottom walls 12 and 13 extending rearwardly from the front wall. A support or bracket bar 14 extends transversely and engages against the outer face of the bumper bar B and is detachably secured thereto as by a bolt 15. At its upper end the bar 14 is bifurcated, the two legs being bent around to provide ears 16 which are apertured to receive a pivot pin 17. A latch or locking link 18 fulcrums at its lower end on the pin 17 and extends upwardly when the guard body is in its vertical or service position as shown in Figures 2 and 3.

The supporting bar 14, below the bumper bar, is deflected outwardly to V-form to provide the portions 14a and 14b, the lower end of the bar being deflected inwardly and upwardly to provide a hook 19. The hook part 19 is comparatively narrow, as shown on Figure 3, the bottom wall 13 of the guard body having an elongated slot 20 for receiving the hook and to form a hinge like connection.

Near the upper end of the bracket bar 14, a channel shaped fitting 21 is secured in the guard body preferably by welding the back of the fitting against the front wall 10 of the guard body and welding the sides thereof against the sides of the guard body. Intermediate its ends the fitting 21 is cut away and the remaining metal is deflected rearwardly at right angles to the back wall of the fitting to provide spaced ears 22 supporting a pivot pin 23 for the latching or locking controlling member 24. This member is a single piece of sheet metal having its rear portion bent to form a hook 25 for receiving the pin 23, the hook end 26 forming a support or abutment for a spring element 27. The spring element shown is a length of wire bent into substantially U-form, the legs thereof near the yoke part being bent to form retaining recesses 28 for receiving the pin 23 between the ears 22 and the sides of the hook 25, the yoke end of the spring seating against the tail end 26 of the hook 25 and the upwardly extending legs of the spring abutting against the front wall of the guard body, the spring tending to hold the latching controlling member 24 swung downwardly.

The latching member 24 has a rectangular slot 29 through which the link 18 extends. As shown, the link 18 is curved, and the slot 29 has the sharp edges 30 and 31 engageable with the edges of the link 18. The spring tends to swing the latching member 24 down for engagement of the sharp edges with the link. Referring to Figure 3, pressure against the upper end of the guard body tending to swing it away from the bumper bar will force the sharp edges more firmly into biting or gripping engagement with the link, and as the latching element 24 is therefore unable to shift longitudinally along the link, the link is held against swing and will hold and lock the guard body in its vertical or service position. However, when the latching controlling member 24 is swung upwardly, the sharp edges thereof will be withdrawn from the link 18 and then the guard body may be freely swung away from the bumper bar. The link 18 is apertured at its outer end for receiving an abutment member such as a cotter pin 32 to be abutted by the latch controlling member 24 to limit the angle of swing of the guard body, as clearly shown on Figure 4. During outward swing of the guard body, the lower wall 13 thereof moves around in the hook 19. The angle of swing shown is usually sufficient to permit the deck door at the rear of an automobile body to be opened. However, if more space is required, the cotter pin 32 could readily be withdrawn and then the guard body could be swung down entirely to hang from the hook 19. This procedure could be used where the guard structure is mounted on the front bumper of an automobile and sufficient maneuvering space would be required in case it is necessary to crank the engine. To restore the guard body to its normal position from its angular position shown in Figure 4, the guard body need merely be swung back to normal position, the spring permitting the latch member 24 to swing so that the sharp edges 30 and 31 will allow free passage of the link 18 through the slot 29. The edges of the side walls 11 of the guard body may be provided with recesses 33 shaped to fit against the convex outer surface of the bumper bar and to extend a distance beyond the upper and lower edges thereof to thereby strengthen the support of the guard body on the bumper bar.

In order to take up all lost motion in the various parts of the bumper structure when in service position, a rubber block or cushion 34 is secured against the outer face of the bracket bar portion 14b and is held in place as by a bolt 35, the rubber cushion being preferably seated and retained in a metal frame 36. The location of this rubber cushion is such that when the guard body is locked in its service position, it will be compressed and will force the inner end of the slot 20 in the guard body bottom against the hook 19, and the pressure will cause the latching element 24 to be tensed sufficiently outwardly to hold its sharp corners in gripping engagement with the link 18, the various elements being thus under tension and all lost motion is taken up so that there can be no rattling and the latching mechanism cannot be accidentally rattled or jarred loose.

In order to protect the bumper bar B against torsional bending or strain, it may be braced from the vehicle chassis. We have shown a brace bar 37 having connection (not shown) with some part of the vehicle chassis and extending forwardly toward the lower end of the bracket bar 14 of the guard structure. This brace bar 37 may be secured as by a bolt 38 to the inner end of an intermediate member 39 secured at its outer end to the portion 14b of the bracket bar 14, and the bolt 35 which secures the rubber cushion 34 may also serve to secure this intermediate part 39. This intermediate securing part 39 may be provided with a slot 40 into which the end of the hook 19 extends so as to lock the guard body against being removed from the hook.

All of the parts of our improved structure are of simple design and readily stamped from sheet metal, and assembly thereof can be very readily accomplished. The latch controlling element 24 may be readily hooked around the pin 23, and the spring element 27 may be readily slipped into place. The guard body may be released for upward swing by merely raising the latching controlling element 24, and when the guard body is swung back to its normal or service position, the latching controlling element and the link 18 will automatically reassume their interlocking condition to lock the guard body in its service position.

Although we have shown a very practical and efficient embodiment of the features of our invention, we do not desire to be limited to the exact construction and arrangement shown and described as changes and modifications may be made without departing from the scope of the invention.

We claim as follows:

1. A bumper guard structure comprising a support member attachable to the bumper of an automobile, a guard body having connection with said support permitting swing of the body away from the support, a link pivoted to said support, and a locking member extending from said body and having interlocking connection with said link for locking said body in its vertical or service position.

2. A bumper structure comprising a bracket attachable to the bumper of an automobile to extend transversely thereof, a guard body having hinge-like connection with the lower end of said bracket adapting said body to be swung away from said bracket, a link pivoted to and extending from the upper end of said bracket, and a locking member pivoted to and extending from said guard body and having friction interlocking engagement with said link for locking said body in its normal vertical service position.

3. A bumper guard structure comprising a bracket element attachable to the bumper of an automobile to extend transversely thereof, a guard body having a connection with the lower end of said bracket permitting swing of said body away from said bracket, a link pivoted to and extending from the upper end of said bracket, and a clamping member extending from said body and having a slot for receiving said link, the corners of said slot presenting sharp edges for friction engagement with said link for locking said body in its vertical service position, said locking member being movable to release the friction engagement for swing of said body away from the bracket.

4. A bumper guard structure comprising a bracket element attachable to the bumper of an automobile to extend transversely thereof, a guard body having connection at its lower end with the lower end of said bracket element for swing away from the bracket element, two latching elements pivoted to and extending from said bracket element and guard body respectively, one of said latching elements having a passageway through which the other latching element extends, and yieldable means tending to relatively position said latching elements for gripping engagement of the edges of said passageway in said one element with said other latching element whereby to interlock said clamping elements against relative movement and prevent swing of the guard body.

5. A guard structure of the class described comprising a bracket element attachable to the bumper of an automobile, a guard body having connection at its lower end with said bracket element for swing away from the bracket element, latching elements pivoted to and extending respectively from said bracket element and said guard body in intersecting relation, one of said latching elements having gripping edges between which the other element extends, and yieldable means tending to hold the gripping edges on said one latching element in gripping engagement with the other latching element whereby to interlock said latching elements and prevent swing of said guard body.

6. A bumper guard structure comprising a bracket element attachable to the bumper of an automobile to extend transversely thereof, a guard body having connection with the lower end of said bracket element for swing from substantially vertical service position to a position at an angle, releasable latching means for locking the guard element to the bracket element against swing from normal position, a rubber cushion interposed between said bracket element and said guard body to be compressed when said guard body is in normal position to thereby take up lost motion of the various parts, a plate for closing said hook to prevent removal therefrom of said guard body, and a common means for securing said plate and said rubber cushion to said bracket element.

7. A guard structure of the class described comprising a bracket element attachable to the bumper of an automobile, a guard body having connection at its lower end with said bracket element for swing into or out of service position, links pivoted to and extending from said bracket element and guard body respectively, means adapting said links for intergripping engagement whereby to prevent swing of said guard body away from said bracket element, yielding means tending to maintain said gripping engagement but permitting movement of one of said links to release said gripping engagement for swing of the guard body away from the bracket element.

8. A guard structure of the class described comprising a bracket element attachable to the bumper of an automobile, a guard body having connection at its lower end with said bracket element for swing into and away from vertical service position, links pivoted to and extending from said bracket element and said guard body respectively, means adapting said links for intergripping connection for locking said guard body in vertical service position, and spring means releasable by movement of one of said links tending to hold said links in intergripping engagement.

HERBERT S. JANDUS.
HUGH BUCHANAN.